United States Patent Office 3,355,438
Patented Nov. 28, 1967

3,355,438
PREPARATION OF ETHYLENE AND ITACONIC ANHYDRIDE COPOLYMERS
Harold D. Lyons, Overland Park, Kans., assignor to Gulf Oil Corporation, Pittsburgh, Pa., a corporation of Pennsylvania
No Drawing. Filed Oct. 29, 1964, Ser. No. 407,572
15 Claims. (Cl. 260—78.5)

This invention relates to copolymers of ethylene and itaconic anhydride, and more particularly to a novel process of preparing the same.

Copolymers of ethylene and itaconic anhydride are known and have been employed for various purposes. While copolymers containing chemically combined itaconic anhydride can be used for a variety of applications, it is also a ready and convenient intermediate for conversion of the anhydride configuration into the acid, ester, or salt form or mixtures thereof. For example, the anhydride structure is readily completely transformed into the salt or amine form by appropriate addition of a base such as, respectively, sodium hydroxide or ammonium hydroxide. Similarly, the anhydride structure is readily hydrolyzed into the acid form, which can then be esterified with appropriate alcohols. The esterified copolymer has particular utility in adhesives, wax additives, coatings, lacquers, the formation of film and the like. As will be understood, partial salts or esters may also be produced by using less than the quantity of reactant required to convert the anhydride structure of the copolymer.

Several methods have been proposed for preparing a copolymer of ethylene and itaconic anhydride followed by the appropriate conversion, if required, of the anhydride structure for the application desired. The processes have generally involved dissolving the itaconic anhydride in an inert solvent followed by copolymerization of the solvated anhydride, in the presence of a catalyst, with ethylene at elevated temperatures and pressures. However, as will be appreciated such prior art processes have the disadvantage of requiring the intermediate step or steps of initially preparing or obtaining the anhydride of itaconic acid.

In contrast to the prior art processes, it has been discovered that copolymers of ethylene and itaconic anhydride can be prepared directly by the copolymerization of ethylene with the monoester of itaconic acid in an alcoholic medium.

Accordingly, it is an object of this invention to eliminate disadvantages of the prior art.

Another object of this invention is to provide a novel process for preparing a copolymer of ethylene and itaconic anhydride.

A further object of this invention is to provide a novel process for preparing a copolymer of ethylene and itaconic anhydride by the direct polymerization of ethylene with a monoester of itaconic acid via an alcoholic medium.

Other objects and advantages of this invention will become more apparent from the description of this invention set out below.

Generally speaking, the invention comprehends polymerizing ethylene, normally in the presence of a catalyst, with a monoester of itaconic acid of the formula

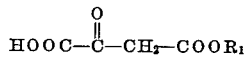

in an alcohol of the formula

wherein both $R_1$ and $R_2$ (of, respectively, the itaconate and the alcohol) are identical and selected from alkyl radicals containing from 1 to 8 carbon atoms.

More specifically, the invention comprises dissolving itaconic acid in a monohydric alcohol of 1 to 8 carbons and then heating the solution to convert the itaconic acid to the monoester of the acid. For convenience and for purposes of this application, this solution of the monoester of itaconic acid in the alcohol may be sometimes referred to as an "alcohol solubilized itaconic acid." A free radical catalyst is added to the reaction vessel along with the alcohol solution of the monoester of itaconic acid. The itaconate reactant is copolymerized with ethylene under elevated pressure by use of a free radical producing catalyst in a mole ratio corresponding to amount of chemically combined itaconate reactant desired in the copolymer.

For reasons not understood, it was unexpectedly found that the resultant product of the polymerization comprised a copolymer of ethylene and itaconic anhydride, wherein the itaconate moieties in the resultant product are substantially completely present as anhydride groups. It is believed that the reaction involves the formation of a transitory copolymer of the monoester of itaconic acid and ethylene, followed by conversion of the monoester itaconate moiety, in the presence of the alcohol, to the anhydride form. Such a reaction could be illustrated as

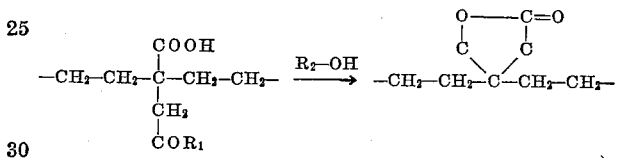

wherein $R_1$ and $R_2$ are the same and define alkyl radicals of 1 to 8 carbons.

Although not critical, in general, the dissolution of and conversion of the itaconic acid in the alcohol to the monoester derivative should generally provide a solution containing, by weight, at least about 50% solids and preferably 67% solids. Solutions of greater and lesser amounts of solids may be employed, and do not detract from the invention, since their reaction with ethylene will proceed directly to the anhydride polymer. At most, the variation in solution solids content will merely vary the rate of polymerization and/or merely require greater attention in the removal of the alcohol from the final product. As will be appreciated, the alcohols contemplated are monohydric and contain from one to eight carbons, to encompass methanol, ethanol, propanols, butanols, hexanols, heptanols and octanols.

The itaconic acid readily dissolves in the alcohols and is easily converted to the monoester by heating the solutions to the boiling point of the alcohol. A detailed procedure for preparation of these materials is as follows.

Charge to the reactor 246 lbs. methanol and 10 lbs. Amberline IR–200 H+ resin. Any strongly acidic cation exchange resin can be used, this also includes Dowex 50 or Dowex 50-2X. These ion exchange resins are prepared by nuclear sulfonation of styrene-divinyl benzene beads. Also charged to the reactor are 500 lbs. refined itaconic acid and 4.5 grams p-methoxy phenol. The reaction mixture was heated to gentle reflux and the reflux temperature maintained for 6 hours. The refluxing operation was continued as long as was required to lower the free acid to the required limits.

Since no provisions are made to remove the water of reaction the reaction will stop at the equilibrium free acid value of 4.4±0.3 meq./gm. Prolonged refluxing will not alter this value and should be avoided to prevent color build-up of the reaction mixture.

As soon as the free acid and total acid titers are within the limits prescribed, the reaction mixture should be cooled to 25° C.±5° C. under an atmosphere of nitrogen. The reaction mixture is then sparkler filtered to obtain the finished product free of ion exchange resin. The sparkler filter should be blown dry with nitrogen; the clear blowings should be composited with the filtrate. No wash is used since it will dilute the finished product.

The wet resin is recycled directly to the next batch.

Typical analysis of finished lots are as follows:

|  | Lot No. 3 | | |
| --- | --- | --- | --- |
| Saponification, mg. NaOH/gm | 405.9 | 421.5 | 414.7 |
| Saponification, as percent itaconic acid | 66 | 68.5 | 67.4 |
| Neutralization equivalent, mg. NaOH/gm | 173 | 194.8 | 180 |

A methanol solution of monomethyl itaconate is generally commercially available from the Chas. Pfizer & Co., Brooklyn, N.Y.

As will be appreciated the copolymer can be prepared with a wide range of the chemically combined itaconic anhydride moiety, ranging, by weight, from 1 to 75. Normally the copolymer will contain, by weight, from about 6 to 24%, and preferably 10 to 15% of the chemically combined itaconic anhydride moiety, with the specific amounts (including more or less than 6 to 24%) of the itaconic anhydride moiety depending upon the particular application desired for the product. Accordingly, the proportions of ethylene and itaconic acid employed in this process will be dependent on the ratio of ethylene to itaconic anhydride desired in the resultant copolymer.

The polymerization can be carried out at a temperature in the range of 250° F. to 550° F. and preferably in the range of 350° F. to 400° F. Optimally, the temperature will be on the order of 325 to 375° F. Generally, the pressures employed will be on the order of 15,000 to 25,000 p.s.i., and preferably from about 21,000 to 23,000 p.s.i. In general the pressures generated and employed will be that of the pressurized ethylene fed to the process.

Any of the free-radical producing catalysts may be used in the process. Typical of these catalysts are such as the peroxy compounds including benzoyl peroxide, ditertiary butyl peroxide, caprylyl peroxide, decanoyl peroxide, azobisisobutyronitrile, dimethyl azoisobutyrate, and others. Mixtures of these catalysts can also be employed if desired.

The following examples are presented to illustrate the invention.

*Example I*

This example is given to illustrate the application of this invention to a continuous operation in a reactor having a residence time of about 106 minutes.

An itaconate feed was prepared by dissolving 500 pounds of itaconic acid in and per 246 pounds of methanol, followed by the addition of an ion exchange catalyst, such as Amberlite IR-200 H+ resin. The mixture was heated to reflux to convert the acid to monomethyl itaconate in the methanol.

The catalyst (or initiator) was dissolved in an inert solvent such as hexane and pumped into the reactor simultaneously with the itaconate feed. The itaconate feed was then fed to the reactor at a rate of 900 cc. per hour simultaneously with a charge of ethylene under a pressure of about 23,000 p.s.i. and at a rate of 55 lbs. per hour. The temperature in the reactor was maintained between 350 and 370° F. Any unreacted ethylene from the reactor was recovered and recycled. The product discharged from the reactor was a copolymer of ethylene and itaconic anhydride containing about 7%, by weight, of chemically combined itaconic anhydride. Any alcohol and water in the copolymer was removed by evaporation by maintaining the copolymer above the boiling points of the remaining water and alcohol.

The copolymer obtained had a density of .9552 gms./cc., a tensile strength of 1240 lbs./sq. in., a yield strength of 1080 lbs./sq. in. and an elongation of 510%.

Infra-red analysis showed that the itaconate moieties were present in the copolymers in the anhydride form.

*Example II*

A solution of 67%, by weight, of monomethyl itaconate in methanol was pumped into the reaction along with a 7.5% solution of decanoyl peroxide in hexane. Ethylene is charged to the solution at a pressure of 23,000 p.s.i., and the reaction mixture maintained at temperature. The polymerization was permitted to proceed to provide copolymers of ethylene and itaconic anhydride containing 7%, by weight, of chemically combined itaconic anhydride.

In either case, infra-red analysis of the copolymer products, of this invention, showed that the itaconate moiety was present in substantially complete anhydride form. Confirmation of the anhydride structure was given by disappearance of the anhydride bands upon hydrolysis of the copolymer with attendant appearance of intense acid bands. In like manner, addition of a base to the copolymer was accompanied by a similar disappearance of the anhydride bands followed by the appearance of intense bands characteristic of organic acid salts.

*Example III*

For purposes of further clarification, an ethylene was copolymerized with itaconic anhydride dissolved in methanol.

In this example, 250 grams of itaconic anhydride was dissolved in 1000 cc. of methanol. A solution of 7.5% decanoyl peroxide dissolved in an inert solvent (such as hexane) was pumped into the reactor along with the itaconic anhydride. The reactor was held at about 350° F. at 21,000 p.s.i. and the anhydride solution was pumped at a rate of 1000 cc./hr. The ethylene rate was 55 lbs./hr.

The polymer was dried and analyzed. This copolymer contained about 7% of a mixture of the acid, ester and anhydride of the itaconate moiety.

Infra-red analysis of the reaction product shows the presence of substantial amounts of free acid and ester groupings on the chemically combined itaconate moieties of the copolymer.

This copolymer had a density of .9389, a tensile strength of 1377 lbs./sq. in., a yield strength of 1377 lbs./sq. in., and an elongation of 85%.

The distinctions between the copolymer of Example III and those of this invention are clearly evident from a comparison of their properties which are set forth side-by-side, below:

|  | Example I | Example III |
| --- | --- | --- |
| Stress Crack, ASTM D-1693 | 10% failures in 14 days. | 90% failures in 3 hours. |
| Structure | Anhydride | Anhydride, acid and ester. |
| Tensile, lbs./sq. in | 1,240 | 1,377. |
| Yield, lb./sq. in | 1,080 | 1,377. |
| Elongation, percent | 510 | 85. |
| Density | 0.9552 | 0.9389. |

Although the invention has been described with reference to specific materials, embodiments and details, various modifications, within the scope of the invention, will be apparent to one skilled in the art and are contemplated to be embraced within the invention.

What is claimed is:

1. A process for preparing a copolymer of ethylene and itaconic anhydride comprising, forming a solution of a monoalkyl itaconate of the formula

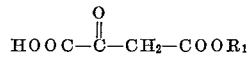

in an alcohol of the formula

wherein $R_1$ and $R_2$ are identical alkyl radicals containing from 1 to 8 carbon atoms; and copolymerizing ethylene with said monoalkyl ester of itaconic acid in said solution in the presence of a free radical catalyst, whereby a copolymer of ethylene and itaconic anhydride is formed.

2. A process for preparing copolymers comprising forming in a solution a monoester of itaconic acid conforming to the formula

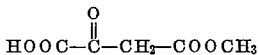

in methanol, and copolymerizing ethylene in the presence of a free radical catalyst with said monoester in said solution, whereby a copolymer of ethylene and itaconic anhydride is formed.

3. A process for preparing a copolymer of ethylene and the anhydride of itaconic acid comprising copolymerizing ethylene in the presence of a free radical catalyst with a monoester of itaconic acid in a solvent at a temperature in the range of 250 to 550° F. and a pressure in the range of 15,000 to 25,000 p.s.i., with said monoester of itaconic acid conforming to the formula $$HOOC-C-CH_2-COOR_1$$

and said solvent is an alcohol conforming to the formula $$R_2-OH$$

wherein $R_1$ and $R_2$ are both identical alkyl radicals containing 1 to 8 carbon atoms, whereby a copolymer of ethylene and itaconic anhydride is formed.

4. The process of claim 3 where $R_1$ and $R_2$ are both methyl radicals.

5. A process for preparing a copolymer of ethylene and itaconic anhydride comprising copolymerizing ethylene in the presence of a free radical catalyst with a monoester of itaconic acid in a solvent at a temperature of 325 to 375° F. and a pressure of 21,000 to 23,000 p.s.i., with said monoester of itaconic acid conforming to the formula

and said solvent is an alcohol conforming to the formula $$R_2-OH$$

wherein $R_1$ and $R_2$ are both identical alkyl radicals containing 1 to 8 carbon atoms, whereby a copolymer of ethylene and itaconic anhydride is formed.

6. The process of claim 5 wherein $R_1$ and $R_2$ are both methyl radicals.

7. A process for preparing copolymers comprising forming a solution by dissolving itaconic acid in a monohydric alkanol containing from 1 to 8 carbon atoms, esterifying said itaconic acid with said alkanol while in solution therein to the monoester of said acid conforming to the formula

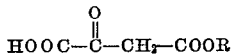

and copolymerizing said monoester in said solution with ethylene in the presence of a free radical catalyst, whereby a copolymer of ethylene and itaconic anhydride is formed.

8. The process of claim 7 wherein said alkanol is methanol and where R is a methyl radical.

9. A process for preparing copolymers comprising forming a solution of itaconic acid in a monohydric alkanol containing from 1 to 8 carbon atoms, heating said solution to the reflux temperature of the alcohol to esterify said itaconic acid with said alkanol while in solution therein to the monoester of said acid conforming to the formula

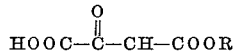

wherein R is an alkyl radical of 1 to 8 carbon atoms corresponding to the alkyl radical of the alkanol used as the solvent copolymerizing said monoester in the presence of a free radical catalyst with ethylene, whereby a copolymer of ethylene and itaconic anhydride is formed.

10. The process of claim 9 wherein said alkanol is methanol and wherein R is a methyl radical.

11. The process of claim 9 wherein said copolymerization is effected at a temperature in the range of 250 to 550° F. and a pressure in the range of 15,000 to 25,000 p.s.i.

12. The process of claim 11 wherein said alkanol is methanol and wherein said ester radical R is a methyl radical.

13. The process of claim 9 wherein said copolymerization is effected at a temperature in the range of 325 to 375° F. and a pressure of 21,000 to 23,000 p.s.i.

14. The process of claim 13 wherein said alkanol is methanol and wherein the ester radical R is a methyl radical.

15. A process for preparing copolymers comprising forming a solution of itaconic acid in methanol, esterifying said itaconic acid with said methanol while in solution therein to the monoester of said acid conforming to the formula

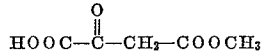

and copolymerizing said monoester in said solution with ethylene in the presence of a free radical catalyst, whereby a copolymer of ethylene and itaconic anhydride is formed.

No references cited.

JOSEPH L. SCHOFER, *Primary Examiner.*

J. KIGHT III, *Assistant Examiner.*